United States Patent [19]

Slemmons

[11] 3,807,314

[45] Apr. 30, 1974

[54] MAGNETIC TROLLEY CONVEYOR SYSTEM

[75] Inventor: Arthur J. Slemmons, Los Gatos, Calif.

[73] Assignee: The United States of America as represented by the Secretary of the Army, Washington, D.C.

[22] Filed: Mar. 30, 1973

[21] Appl. No.: 346,505

[52] U.S. Cl................ 104/148 R, 104/88, 104/93, 104/96, 104/165, 198/41
[51] Int. Cl............................................ B60m 7/00
[58] Field of Search............ 104/88, 89, 91, 93, 96, 104/147 R, 148 R, 148 MS, 165, 172 S; 198/41, DIG. 13; 46/230, 231, 235, 240, 242, 243 P

[56] References Cited
UNITED STATES PATENTS

| | | | |
|---|---|---|---|
| 3,760,245 | 9/1973 | Halvorsen | 104/148 MS X |
| 3,757,700 | 9/1973 | Nakagawa et al. | 104/148 R X |
| 3,712,236 | 1/1973 | Massaglia | 104/93 |
| 3,605,627 | 9/1971 | Homeier et al. | 104/88 |
| 3,554,131 | 1/1971 | Radovic | 104/165 |

Primary Examiner—Lloyd L. King
Assistant Examiner—Randolph A. Reese
Attorney, Agent, or Firm—Edward J. Kelly; Herbert Berl; Thomas R. Webb

[57] ABSTRACT

A conveyor system has trolleys propelled by the friction of a non-magnetic moving belt and the attractive force of a magnet acting through the belt to a stationary metal keeper plate behind each moving belt. Trolleys are switched between rails by means of a solenoid actuated lever roller, operatively positioned behind the driving belt, which pushes the trolley away from its keeper toward a ferrous sheave that has a non-magnetic belt thereon. A magnet on the sheave side of the trolley attracts the trolley toward the sheave and causes the guide rollers of the trolley to follow the desired switch rail.

5 Claims, 5 Drawing Figures

MAGNETIC TROLLEY CONVEYOR SYSTEM

GOVERMENTAL INTEREST

The invention described herein may be manufactured, used and licensed by or for the Government for governmental purposes without the payment to me of any royalty thereon.

BACKGROUND OF THE INVENTION

Various means have been used in the prior art to convey material in a manufacturing operation from one work station to another in order to effect the efficient assembly and/or manufacture of a device or product. High production rates of modern automated equipment has required the conversion of operations that previously were done by hand to new mechanized methods for material handling. In addition, the improvements in automation and faster production rates make mechanization of material handling and assembly operations a necessity in many instances in order to avoid operator fatigue and improve safety conditions.

In the past prior art material handling devices have utilized fork lift trucks carrying tote boxes, overhead chain conveyors with parts on hooks or in baskets, belt or wire mesh conveyors to carry parts, and vibrating troughs to convey parts or material from one work station to another on the same machine or from one machine to another for subsequent operations or assembly with other components. These prior art means for handling bulk types of material are inefficeient, since the material is generally first lumped together in bins, tote boxes, and baskets which must then subsequently be disentangled, singulated, and picked up again. The prior art chain type conveyors are generally unsatisfactory because the parts must go wherever the chain goes. Trolleys for carrying material driven by chains are also undesirable because the chains are heavy, noisy and are necessarily rather slow because of the high acceleration imparted to the trolley during the pick up of the trolley by the chain from a stationary position.

SUMMARY OF THE INVENTION

The present invention relates to a trolley conveyor system for assembling a plurality of bags or other objects by means of a moving belt and a trolley utilizing magnetic attraction. Each trolley has a plurality of magnets operatively attached to it in order to provide a magnetic field on each of its sides. The moving belt is operatively positioned along one side of the trolley by a stationary ferrous plate or belt guide bar.

The attractive magnetic field of the magnets pulls the trolley toward the stationary ferrous plate or keeper rail and against the moving belt. The friction between the trolley magnets and the moving belt in combination with the magnetic attractive force between the stationary ferrous plate is sufficient to overcome roller frictional forces and to propel the trolley on its track, which runs parallel with the moving belt.

Assembly of bags or other objects carried by the trolley is achieved by first gathering together a group of trolleys on their separate tracks with the appropriate objects needed to make up the assembly. This group of trolleys is pushed onto a common track which has its own propelling belt and then switched to an assembly area or assembly machine.

Switching is achieved by mechanically pushing the propelling belt away from the stationary ferrous plate or keeper rail towards another belt surrounding the periphery of a ferrous pulley. The trolley because of the new stronger attractive force is pulled toward the ferrous pulley and then propelled by the other belt in a curved path onto a rail or track going in a different direction. The bags or objects being carried by the trolley are automatically released and then dropped into containers, as they pass over the container, by a simple teeter-totter hooking means attached to the trolley. Empty trolleys are automatically returned by the propelling means to various stations where the teeter-totter mechanism picks up a new bag or object thereby repeating the assembly cycle.

One of the objects of the present invention is to provide a means for rapidly conveying different objects simultaneously on the same conveying system from different origins to varying destinations.

Another object of this invention is to provide for smooth acceleration of a conveyor trolley when it begins its travel in the conveying system.

A further object of this invention is to provide a switching means for a magnetic, friction propelled trolley that rapidly and smoothly transfers the trolley from one conveyor line to another.

For a better understanding of the present invention, together with other and further objects thereof, reference is made to the following description taken in connection with the accompanying drawings.

BRIEF DESCRIPTION OF THE DRAWINGS

Throughout the following description like reference numerals are used to denote like parts in the drawings.

DESCRIPTION OF THE PREFERRED EMBODIMENTS

Figure 1:
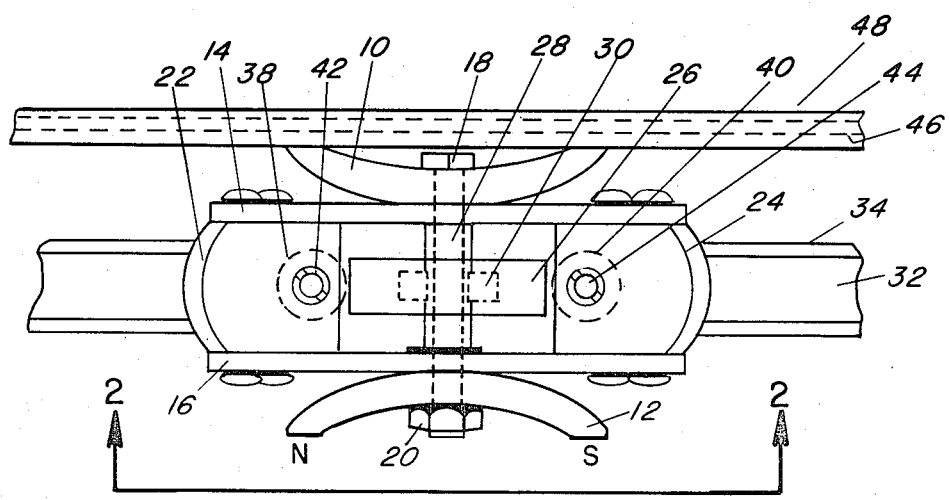
FIG. 1 is a plan or top view of a magnetic bag carrying trolley, a wheel rail, a ferrous keeper rail, and a moving belt.

Referring now to FIG. 1, a pair of magnets 10 and 12 are fixedly held to a rectangularly shaped, parallel spaced, trolley first plate member side 14 and to a second T-shaped plate member side 16 by a bolt 18 and nut 20. The plate member sides 14 and 16 are held apart by a pair of bumper separators 22 and 24. A top roller 26 is rotatably mounted on bolt shaft 28 by means of top roller bearing 30. Top roller 26 fits intermediate bumper separators 22 and 24 and rides on the top surface 32 of the wheel rail 34 which has a "U" shaped rail groove 36 therein (not shown in this view). To help guide and balance the trolley along wheel rail 34 a pair of horizontally top rotating guide rollers 38 and 40 are operatively positioned on horizontal guide roller shafts 42 and 44 respectively which are in turn vertically mounted and fixedly held in bumpers 22 and 24 so that the guide rollers 38 and 40 will ride within the rail groove 36 when the top roller 26 rides on top surface 32. When the trolley is being propelled as aforedescribed on rail 34, the magnet 10 or 12 will have its magnetic terminals N and S in contact with a flexible non-magnetic moving belt 46 and held thereto by a stationary ferrous keeper rail 48.

Figure 2:
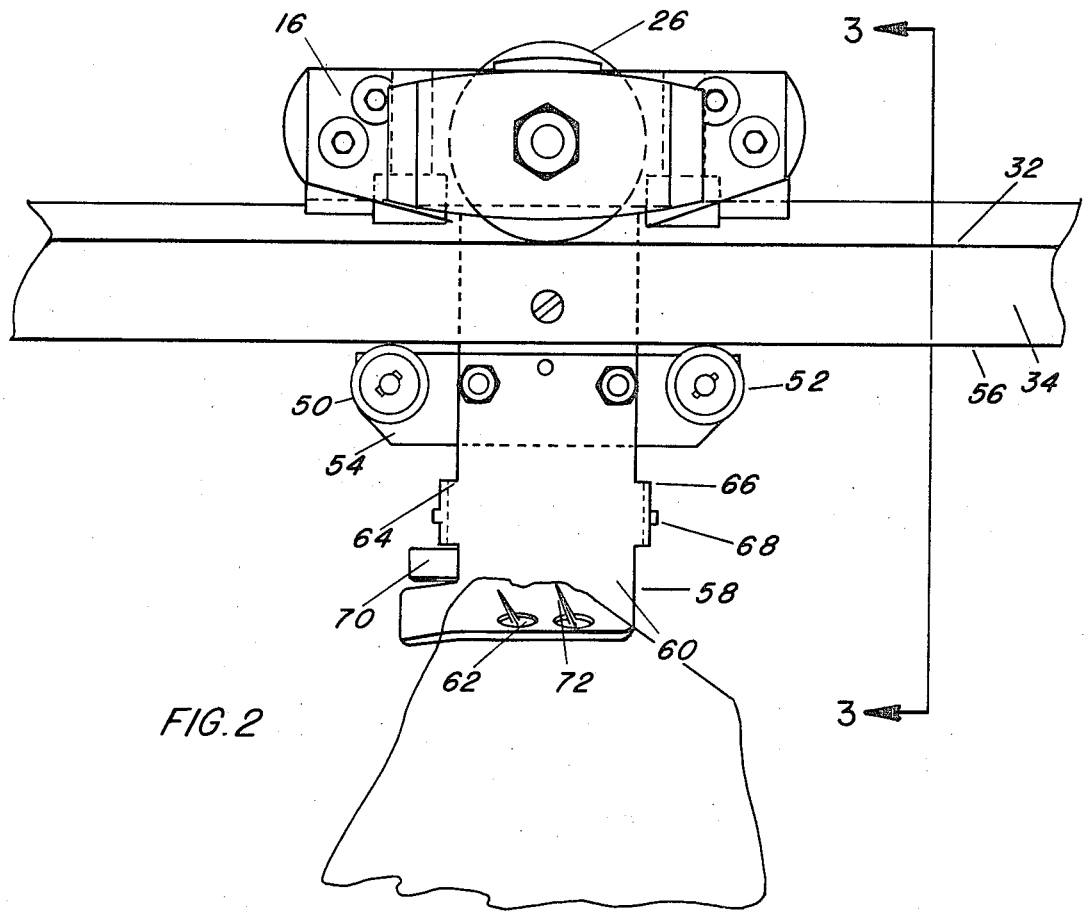
FIG. 2 is a front elevational view of the magnetic bag carrying trolley and the wheel rail taken along line 2—2 of FIG. 1.
Figures 3, 4:
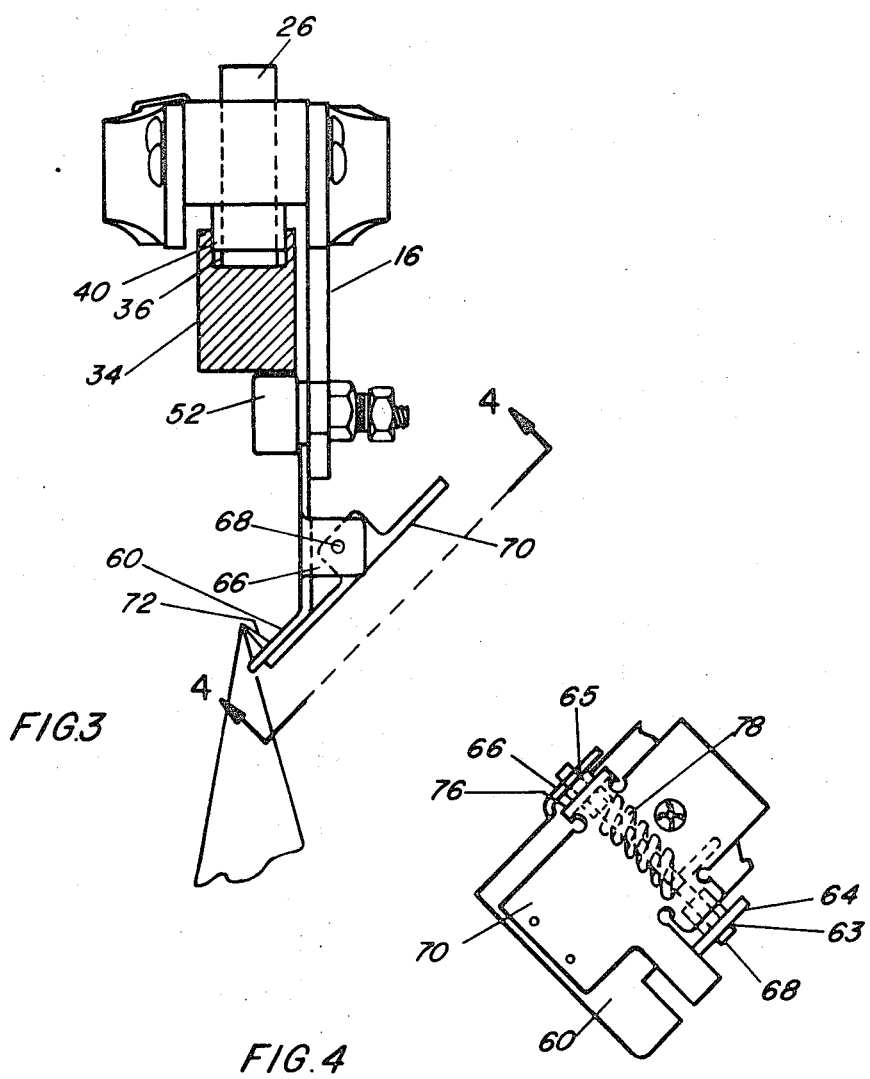
FIG. 3 is a side elevational and partial cross-sectional view of the trolley and the wheel rail taken along line 3—3 of FIG. 2.
FIG. 4 is an elevational view taken along line 4—4 of the drawing illustrated in FIG. 3 showing the hinge details of the hooking means showing a stationary plate member and a spring biased movable plate member.

FIG. 2 shows a front view of the trolley positioned on rail 34 with top roller 26 contacting wheel rail top surface 32 and a pair of bottom guide rollers 50 and 52 operatively positioned on the bottom end 54 of the trolley "T" shaped plate member side 16 so that the bottom guide rollers 50 and 52 contact the wheel rail bottom surface 56. A spring loaded, material carrying, pivoted hooking means 58 is fixedly attached to the bottom end 54 by a stationary member 60 which has pin clearance holes 62 therein and integrally formed flap sections 64 and 66 each having axially aligned pivot holes 63 and 65 therein as shown in FIG. 4 for holding a pivot 68. A movable spring biased plate member 70, hinged to pivot 68, has material holding pins 72 which protrude and pass through clearance holes 62 when plate members 64 and 70 are in the closed position. Material to be conveyed in a bag 73 by the trolley is hung on pins 72. When plate members 64 and 70 are separated from each other by a pushing means (not shown), the bag 73 will disengage and fall from the trolley because of the withdrawal of supporting pins 72.

FIG. 3 is a partial cross-sectional, side view of the trolley, wheel rail 34 and the spring loaded material carrying pivoted hooking means 58. Horizontal top guide rollers 38 (not shown in this view) and 40 operatively positioned in rail groove 36 control horizontal positioning of the trolley while vertical positioning is controlled by top roller 26 and bottom guide rollers 50 and 52, (50 not shown in this view) which hold wheel rail 34 intermediate thereto. Bottom guide rollers 50 and 52 are operatively held to the T-shaped plate member 16 by bottom guide roller threaded shafts 74, one of which cannot be seen in this view. Hooking means stationary plate member 60 and the movable spring biased plate member 70, which is supported by flap section 66 and pivot 68, are shown in the normally closed carrying position.

Referring now to FIG. 4, movable plate member 70 is operatively held adjacent to stationary plate member 60 by a pair of integral flap sections 74 which rotatably fit around a pair of bushings 76 which in turn are held on pivot 68. The movable plate member 70 is biasedly held in the closed position shown in FIG. 3 by a helical torsion spring 78.

Figure 5:
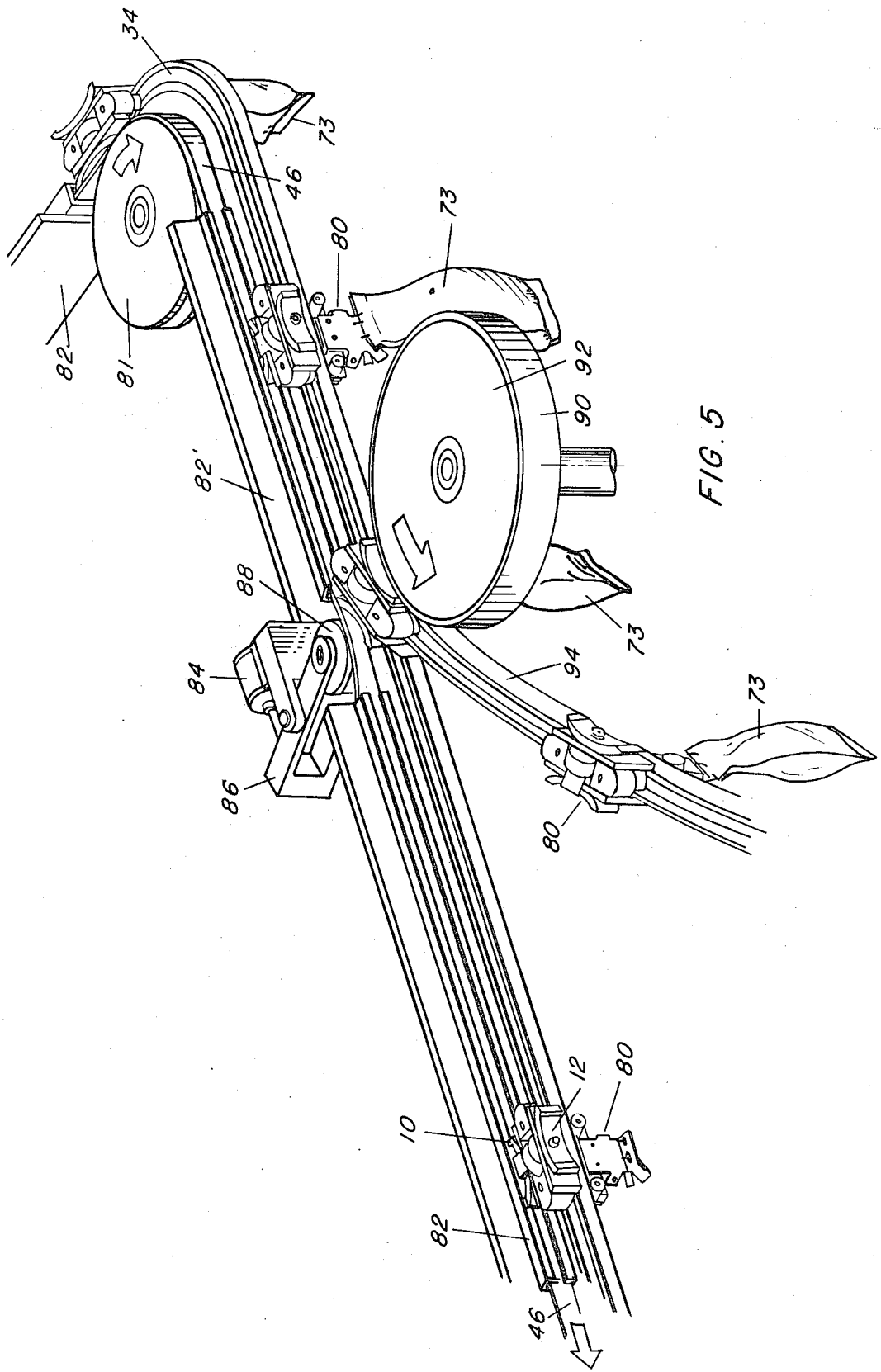
FIG. 5 is an isometric view of a section of the conveyor system showing a trolley switching station.

FIG. 5 shows a typical switching station used in the magnetic trolley conveyor system. A plurality of bags 73 or other objects are propelled by means of a trolley 80 which rides on wheel rail 34. A flexible belt 46, driven by drive pulley 81, is slidably contained within a stationary ferrous keeper rail belt guide channel 82. The trolley 80 as aforedescribed has at least one permanent magnet 10 and preferably two, attached to it so as to provide a magnetic field on each side of the trolley. The magnetic field of magnet 10 pulls the trolley 80 toward the ferrous keeper rail guide channel 82 and against the moving belt 46. Switching is achieved by a diverter solenoid 84, which is operatively positioned itermediate belt guide ferrous rail 82 and ferrous rail section 83. The solenoid 84 causes a pivoted lever 86, which has a freely rotating lever wheel 88 attached thereto, to push the propelling belt 46 away from the ferrous plates 82 and 83 toward a sheave belt 90 which is fixedly positioned on the periphery of a rotating ferrous pulley 92. The trolley 80 is attracted to and propelled by the sheave belt 90 and pulled in a curved path onto a switch rail 94 going in a different direction.

While there has been described and illustrated specific embodiments of the invention, it will be obvious that various changes, modifications and additions can be made therein without departing from the field of the invention which should be limited only by the scope of the appended claims.

Having thus fully described the invention, what is claimed as new and desired to be secured by Letters Patent of the United States is:

1. A magnetic trolley conveyor system for transporting material from one work station to another which comprises:

a trolley which includes rolling means having a first and second plate member side operatively affixed thereto;

a plurality of magnets fixedly attached to said first and second plate member sides for generating a magnetic field on each side of said rolling means;

pivotal hooking means fixedly attached to said second plate member side;

track means having a "U" shaped rail groove longitudinally positioned therein for guiding said rolling means;

a switch rail angularly positioned adjacent said track means;

a stationary ferrous keeper rail operatively positioned adjacent and parallel to said track means;

a moving belt intermediate said stationary keeper rail and said track means whereby the magnets adjacent to said belt are attracted to said ferrous-keeper rail and against said moving belt, causing said trolley to be propelled by said moving belt along said track means; and means for switching said trolley from said track to said switch rail.

2. The conveyor system as recited in claim 1 wherein the rolling means comprises:

a top roller;

a bolt shaft for rotatably holding said top roller intermediate said first and second plate member sides;

a pair of bumper separators fixedly positioned intermediate said plate member sides;

a pair of horizontal top guide rollers rotatably positioned in said bumper separators for contacting said rail groove; and a pair of bottom guide rollers operatively held in said second plate member side so that said bottom guide rollers contact the bottom surface of said track when said top roller and said top guide rollers contact said rail groove.

3. The conveyor system as recited in claim 2 wherein said hooking means comprises:

a stationary plate member having a fixed end attached to said second plate member side and pin clearance holes in its opposite free end, a pair of integrally formed flap sections intermediate said fixed end and said free end each having axially aligned pivot hole therein;

a pivot fixedly positioned in said pivot holes;

a movable member pivotally attached to said stationary plate member having material holding pins, on one end of said movable member, which passes through said clearance holes when said movable member and said stationary plate member are in a closed position; and a helical torsion spring operatively positioned on said pivot for biasedly holding said movable member in a normally closed position against said stationary member when said holding pins are supporting said material and permitting said movable member to rotate about said pivot when it is desired to release said material from said trolley.

4. The conveyor system as recited in claim 3 wherein the means for switching comprises:

a ferrous sheave rotatably positioned on one side of said moving belt;

a non-magnetic sheave belt positioned in said sheave;

a diverting means operatively positioned on the opposite side of said moving belt for pushing said trolley away from the stationary keeper rail and toward said sheave when said trolley is to be routed to said switch rail.

5. The conveyor system as recited in claim 4 wherein said diverting means comprises:

a pivoted lever having a freely rotatable lever wheel on one end; and a solenoid operatively attached to the other end of said pivoted lever.

* * * * *